(12) United States Patent
Berndt et al.

(10) Patent No.: US 11,442,581 B2
(45) Date of Patent: Sep. 13, 2022

(54) METHOD FOR DISPLAYING AT LEAST ONE ADDITIONAL ITEM OF DISPLAY CONTENT

(71) Applicant: AUDI AG, Ingolstadt (DE)

(72) Inventors: Benjamin Berndt, Nuremberg (DE); Timo Schaschek, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/266,354

(22) PCT Filed: Jul. 17, 2019

(86) PCT No.: PCT/EP2019/069224
§ 371 (c)(1),
(2) Date: Feb. 5, 2021

(87) PCT Pub. No.: WO2020/043389
PCT Pub. Date: Mar. 5, 2020

(65) Prior Publication Data
US 2021/0311587 A1    Oct. 7, 2021

(30) Foreign Application Priority Data

Aug. 30, 2018   (DE) .................. 10 2018 214 784.1

(51) Int. Cl.
*G06F 3/042*  (2006.01)
*B60K 35/00*  (2006.01)
(Continued)

(52) U.S. Cl.
CPC ............ *G06F 3/0425* (2013.01); *B60K 35/00* (2013.01); *G06F 3/017* (2013.01);
(Continued)

(58) Field of Classification Search
CPC .... G06F 3/0425; G06F 3/017; G06F 3/04842; G06F 2203/04804; B60K 35/00;
(Continued)

(56) References Cited

U.S. PATENT DOCUMENTS

2009/0278915 A1* 11/2009 Kramer ................ G06V 40/107
  345/158
2013/0106898 A1*  5/2013 Saint-Loubert-Bie .....................
  G06F 1/1684
  345/592
(Continued)

FOREIGN PATENT DOCUMENTS

DE    102006061778 A1    6/2008
DE    102007023290 A1   11/2008
(Continued)

OTHER PUBLICATIONS

Notification of Transmittal of Translation of the International Preliminary Report on Patentability dated Mar. 11, 2021, in connection with corresponding International Application No. PCT/EP2019/069224; 7 pages.

(Continued)

*Primary Examiner* — Ibrahim A Khan
(74) *Attorney, Agent, or Firm* — Maier & Maier, PLLC

(57) ABSTRACT

A method for displaying at least one additional item of display content on a display panel which is arranged in an interior of a vehicle, in which at least one sensor is used, using which a spatial corridor in the interior of the vehicle is optically monitored. The spatial corridor is delimited by two virtual boundary surfaces. At least one spatial virtual reference surface is defined in the spatial corridor between the virtual boundary surfaces, to which the at least one additional item of display content is assigned. The at least one sensor is used to detect whether a hand of a user is located in the corridor.

19 Claims, 2 Drawing Sheets

(51) Int. Cl.
*G06F 3/01* (2006.01)
*G06F 3/04842* (2022.01)

(52) U.S. Cl.
CPC .... *G06F 3/04842* (2013.01); *B60K 2370/141* (2019.05); *B60K 2370/146* (2019.05); *G06F 2203/04804* (2013.01)

(58) Field of Classification Search
CPC ........ B60K 2370/141; B60K 2370/146; B60K 2370/11; B60K 2370/111; B60K 2370/113; B60K 2370/115; B60K 2370/1464; B60K 2370/152; B60K 2370/21; B60K 2370/52; B60K 37/06
See application file for complete search history.

(56) References Cited

U.S. PATENT DOCUMENTS

| | | | | |
|---|---|---|---|---|
| 2015/0370405 | A1* | 12/2015 | Oda | B60K 37/06 |
| | | | | 345/174 |
| 2016/0103605 | A1* | 4/2016 | Mese | G06F 3/017 |
| | | | | 345/174 |
| 2016/0117081 | A1* | 4/2016 | Pujia | G06F 3/0482 |
| | | | | 715/771 |
| 2017/0237945 | A1* | 8/2017 | Murar | H04N 7/183 |
| | | | | 348/148 |
| 2017/0286785 | A1* | 10/2017 | Schaffer | B60K 37/06 |
| 2017/0349099 | A1* | 12/2017 | Kunze | G02B 27/0101 |
| 2018/0232057 | A1* | 8/2018 | Takada | G06F 3/017 |

FOREIGN PATENT DOCUMENTS

| | | |
|---|---|---|
| DE | 102009006448 A1 | 8/2010 |
| DE | 102009036369 A1 | 2/2011 |
| DE | 102014200024 A1 | 7/2015 |
| DE | 102014218504 A1 | 3/2016 |
| DE | 102014226553 A1 | 6/2016 |

OTHER PUBLICATIONS

International Search Report and Written Opinion dated Oct. 18, 2019 in corresponding International application No. PCT/EP2019/069224; 13 pages.

German Office Action dated Jul. 15, 2019 in corresponding application No. 102018214784.1; 24 pages.

* cited by examiner

METHOD FOR DISPLAYING AT LEAST ONE ADDITIONAL ITEM OF DISPLAY CONTENT

FIELD

The invention relates to a method and a system for displaying at least one additional item of display content on a display panel.

BACKGROUND

A display panel and a proximity sensor can be arranged in an interior of a vehicle. This proximity sensor can be used to detect whether a hand of an occupant of the vehicle is approaching the display panel. An interaction and display concept that can be implemented here comprises the measure that display content that can be displayed on the display panel is either switched on or off depending on an approach of the hand. For this purpose, direct proximity of the hand to the display panel is necessary using the sensor. It is possible to reduce and/or remove or expand and/or add existing items of display content. An effect of the approach of the hand only has an effect on a current item of display content that is already shown on the display panel. Furthermore, an approach is only categorized according to whether the hand is on the display panel or not. However, no further following interaction is possible using such an interaction and display concept.

A method for determining a seated position of an occupant in a vehicle and an operating element for a vehicle are known from document DE 10 2009 006 448 A1.

A vehicle having freely positionable haptic operating elements is described in document DE 10 2014 218 504 A1.

Document DE 10 2014 226 553 A1 describes a method for operating an input device of a vehicle.

SUMMARY

Against this background, it was an object to control a display of an additional item of display content on a display panel in a vehicle.

The method according to the invention is provided for optically displaying at least one additional item of display content on a display panel or display, for example a monitor, which is arranged in an interior of a vehicle, in particular a motor vehicle or automobile. At least one sensor is used, using which a spatial corridor in the interior of the vehicle is optically monitored, wherein the spatial corridor is delimited by two virtual boundary surfaces, wherein at least one spatial virtual reference surface will be or is defined in the spatial corridor between the boundary surfaces, to which the at least one additional item of display content will be or is assigned. The at least one sensor is used to detect whether a hand of a user of the method is located at all in one corridor and whether the hand is possibly being moved in the corridor, wherein a relative position of the hand in relation to the at least one reference surface is ascertained. An opacity or intensity with which the at least one additional item of display content, which is or will be assigned to the at least one reference surface, is displayed on the display panel is set depending on the position of the hand relative to the at least one reference surface.

It is possible that the opacity or intensity of the at least one additional item of display content that is assigned to the at least one reference surface is displayed, for example, as a function of the distance of the hand to the at least one reference surface. It can be checked here whether the hand or its current position intersects the at least one reference surface. If this is the case, the additional item of display content is shown, for example, with maximum intensity or opacity.

In one embodiment, the method is used to select and display a specific additional item of display content from a number of multiple displayable additional items of display content on the display panel, wherein multiple spatial reference surfaces will be or are defined in the spatial corridor, each of which is or will be assigned an additional item of display content. It is determined which spatial reference surface is intersected by the hand, wherein that additional display content is selected manually and displayed on the display panel with a respective provided, for example maximum opacity, which is assigned to the spatial reference surface that is intersected by the hand.

As a rule, the boundary surfaces of the corridor are arranged parallel to one another and, for example, designed as flat boundary surfaces. The at least one reference surface is arranged between the boundary surfaces with an extension that is usually parallel to them and is also flat in design. If only one additional item of display content can be displayed or can be selected for display, only one reference surface is provided, which is usually located in the middle between the two boundary surfaces. If it is possible to select from a number of multiple additional items of display content using the method, a corresponding number of reference surfaces is defined in the corridor, which are, for example, arranged equidistantly between the boundary surfaces, wherein an additional item of display content will be or is assigned to each reference surface.

It is thus possible that only that additional item of display content selected on the basis of the position of the hand is displayed on the display panel, whereas further additional items of display content that are assigned to further reference surfaces, in contrast to the selected additional item of display content, are not displayed or are hidden. A selection is made, for example, exactly when the hand intersects or hits the virtual reference surface.

In one embodiment, the method can be carried out using multiple sensors that are spatially distributed at different positions within the interior of the vehicle, wherein each sensor monitors the corridor from its position. The corridor can thus be monitored from different spatial positions and/or perspectives at the same time, whereby it can be recognized more precisely whether the hand is located in the corridor and/or which reference surface is intersected by the hand. By using multiple sensors, it is also possible to differentiate between individual fingers of the hand, a palm of the hand, the back of the hand, and a wrist and/or arm of the user on which his hand is located. It is thus possible, for example, that the position of the hand intersects a first reference surface in the corridor. However, it is also possible for the wrist and/or the arm to intersect a second reference surface within the corridor, wherein this second reference surface can be adjacent to the first reference surface. By using multiple sensors, however, it is possible to distinguish between different positions at which different body parts of the user, i.e., on the one hand his hand and on the other hand his wrist and/or arm, is or are. It can be checked and thus distinguished whether a respective reference surface is intersected by the hand including its fingers or another part of the body. Whether and, if applicable, which additional display content is displayed depends on the position of the hand, i.e., which reference surface is intersected or at least touched by the hand. In one possible embodiment that additional display content is displayed to whose reference surface the hand has a distance which is less than a predefined threshold value.

It is also possible that the hand is moved within the corridor, for example relative to all reference surfaces, wherein the at least one additional item of display content is selected and displayed depending on a movement and thus a change in the position of the hand, wherein it is possible to switch between additional items of display content to be displayed.

In one embodiment of the method, a function is used that describes the opacity or intensity with which each additional item of display content is displayed depending on the position of the hand relative to a respective reference surface to which the respective additional item of display content is or will be assigned, wherein the opacity of the at least one additional item of display content, usually all additional items of display content, is set to a minimum value, for example 0%, when the position of the hand is located outside the corridor. The opacity of each additional item of display content is set to a maximum value, for example 90%, when the position of the hand intersects the respective reference surface to which the respective additional item of display content is assigned. The opacity of the at least one additional item of display content is set to a transition value that is greater than the minimum value and less than the maximum value when the position of the hand intersects one of the boundary surfaces of the corridor, which means that the position of the hand is located at a boundary of the corridor. It is conceivable that the closer the hand comes to a respective reference surface, the greater the opacity with which the additional item of display content assigned to the respective reference surface is displayed.

In a further embodiment, it is possible that the transition value for the opacity is set depending on the respective distance of the hand to the respective reference surface. If the hand is at the border between two immediately adjacent reference surfaces, the transition value can also be determined, for example, on the basis of a first distance of the hand to a first reference surface and a second distance of the hand to a second reference surface. The opacity, in particular the transition value provided for this, can be ascertained for a respective additional item of display content using the function depending on the first distance to the first reference surface and at the same time depending on the second distance to the second reference surface. It is possible here to determine which of the two possible reference surfaces the hand has the least distance to. Here, for example, that additional item of display content can be shown having the maximum value of opacity or intensity that is assigned to the reference surface to which the hand is at the smaller distance, whereas that additional item of display content is assigned to that immediately adjacent reference surface from which the hand has the Igreater distance, is shown with the minimum value for the opacity and is thus hidden.

It is possible that a basic display content is already shown on the display panel, which is at least partially overlaid by the at least one additional item of display content, depending on the respective opacity, in particular depending on the maximum value, transition value, and/or minimum value of the opacity. Using the at least one additional item of display content, for example a menu for different functions can be displayed. In the case of multiple different additional items of display content, it is possible that one additional item of display content is assigned to a function that can be triggered by a hand gesture.

Using the method, an additional item of display content can be selected depending on the current position of the hand, wherein a movement and/or gesture of the hand, for example at least one finger of the hand at the or this position, is registered by the at least one sensor. This movement and/or gesture can be used to select and/or execute a function symbolized by the additional item of display content at the current position of the hand.

In one embodiment, the at least one additional item of display content is displayed when the hand intersects the reference surface assigned to it. If the corridor has several reference surfaces, for example arranged equidistant from one another, and the hand moves through the corridor from a first of the two boundary surfaces to a second of the two boundary surfaces, only one additional item of display content is always displayed in succession, starting with a first additional item of display content which is assigned to a first reference surface is assigned, which is arranged immediately adjacent to the first boundary surface of the corridor, and ending with a last additional item of display content, which is assigned to a last reference surface which is arranged immediately adjacent to the second boundary surface of the corridor. In between, each one of the other additional items of display content is shown in succession during the movement. If the hand intersects the first boundary surface of the corridor, the first additional item of display content is shown, for example, depending on the distance from the first reference surface, taking into consideration a transition value for the opacity that is dependent on this distance. If the hand intersects the last boundary surface of the corridor, the last additional item of display content is shown, for example, depending on the distance from the last reference surface, taking into consideration a transition value for the opacity that is dependent on this distance.

The system according to the invention is designed to display at least one additional item of display content on a display panel which is arranged in an interior of a vehicle designed as a motor vehicle, in particular an automobile, and has at least one sensor and a control unit. The at least one sensor is designed to optically monitor a spatial corridor in the interior of the vehicle, wherein the spatial corridor is delimited by two virtual boundary surfaces, wherein at least one spatial virtual reference surface will be or is defined in the spatial corridor between the boundary surfaces, to which the at least one additional item of display content will be or is assigned. The at least one sensor is also designed to recognize whether a hand of a user of the system is located in the corridor and is possibly being moved in the corridor, wherein the at least one sensor and/or the control device is/are designed to ascertain a relative position of the hand to the at least one reference surface. The control device is designed to set an opacity or intensity with which the at least one additional item of display content, which is or will be assigned to the at least one reference surface, is can be displayed or is displayed or will be displayed on the display panel depending on the position of the hand relative to the at least one reference surface.

The at least one sensor is designed as a camera, which is designed in particular to recognize hand gestures.

With one embodiment of the method using one embodiment of the system, it is possible to temporarily display the additional item of display content, for example an overlay menu, on the display panel or display in front of the display panel depending on the position of the hand within the specific spatial corridor. A respective selectable additional item of display content is only displayed in accordance with the opacity, which is dependent on the position of the hand, if the hand intersects the reference surface to which the respective additional item of display content is assigned. If the hand is outside the corridor, no additional display content is shown on the display panel.

The at least one sensor can be designed in one embodiment as a proximity sensor or position sensor, wherein it is furthermore possible that multiple sensors are used, wherein at least one first sensor is designed as a camera, in particular for recognizing gestures, and at least one second sensor is designed as a proximity sensor so that different types of sensors can be used to monitor the corridor from different positions or perspectives. Thus, a capability of a sensor, in particular a proximity sensor, is not only reduced to the fact that it is recognized whether the hand is on the display panel or not and that additional items of display content are displayed accordingly. The sensor, for example designed as a proximity sensor, is used within the scope of the method at least for monitoring, registering, and/or recognizing the corridor, wherein it is not only monitored, registered, and/or determined whether the hand is located in the corridor at all, in particular in front of the display panel. In addition, the at least one sensor is also used to monitor, register, and/or ascertain the exact position at which the hand is located in the interior and in particular in the corridor or within the corridor relative to the at least one reference surface, wherein a displayable additional item of display content assigned to the at least one reference surface can be shown depending on this precise position within the corridor.

The at least one additional item of display content that can be displayed within the scope of the method is temporarily superimposed on the basic display content already shown, wherein the additional item of display content also displays or shows a menu that is independent of the basic display content, in particular an overlay menu or superimposed menu. If the hand is at a position within the corridor for a period of time and moves at this position, i.e., moves at least one finger and/or rotates or performs a gesture, wherein the hand at the position can move to the left or right, in particular rotate, for example, a context shown with the respective additional item of display content or a function symbolized thereby can also be selected and further activated. A final selection and/or activation of a context or a symbolized function is possible by performing a possibly optional confirmation gesture of the hand.

To carry out the function, it is checked whether the hand is located within the corridor. This has an advantageous effect on the comfort of the user, since he no longer has to bend forward so that his hand directly approaches the display panel. In addition, the already existing basic display content on the display panel is not changed, since this is still shown at least in the background on the display panel and is only overlaid by the at least one additional item of display content, temporarily hidden in one embodiment, which is the case when the basic display content is located behind the at least one additional item of display content. An orientation of the user in the display panel thus remains. By positioning the hand at a respective position within the corridor, i.e., for example when intersecting the at least one reference surface, a global, temporary menu can be displayed and thus generated as the at least one additional item of display content, independently of the currently already displayed basic display content. By precisely ascertaining and/or determining the position of the hand in the corridor, an approach to the display panel can be categorized more finely in one embodiment ("hand within the corridor and at which position?"). As soon as the user has selected a desired additional item of display content by positioning the hand at a respective position, the additional movement and/or gesture of the hand at this respective position can furthermore trigger and/or activate a subsequent interaction, for example a function represented by the additional item of display content.

The at least one sensor can be designed as a 3D camera, for example a TOF camera or time-of-flight camera. Depending on the position of the hand in the corridor, the at least one sensor provides a signal having data about the ascertained position and transmits it to the control device in which software is implemented that is designed evaluate the data registered and/or ascertained at the respective position and to set the respective additional item of display content on the display panel depending on the current position, wherein the additional item of display content is still shown having the respective provided opacity depending on the current position of the hand.

In a further embodiment, in addition to the position of the hand, the at least one sensor also recognizes a hand gesture, wherein the at least one sensor can also be used alone or in combination with the control unit of the system for gesture control and/or gesture recognition. The at least one sensor is designed as an interior camera of the vehicle to follow and thus track the position, movement, and/or gesture of the hand. A corridor in the interior of the vehicle which is larger than a small region directly in front of the display panel on which the additional item of display content is displayed can be monitored and/or registered using multiple sensors. It is thus also possible to use multiple cameras to register the complete interior of the vehicle from different spatial perspectives. The corridor in which the respective position of the hand is ascertained or registered is therefore larger than the comparatively small region directly in front of the display panel.

It is apparent that the above-mentioned features and the features still to be explained hereinafter are usable not only in the particular specified combination but rather also in other combinations or alone, without leaving the scope of the present invention.

BRIEF DESCRIPTION

The invention is illustrated schematically in the set of drawings on the basis of embodiments, and will be described schematically and in detail with reference to the drawings.

DETAILED DESCRIPTION

The figures are described coherently and comprehensively; the same components are assigned the same reference numbers.

Figure 1:
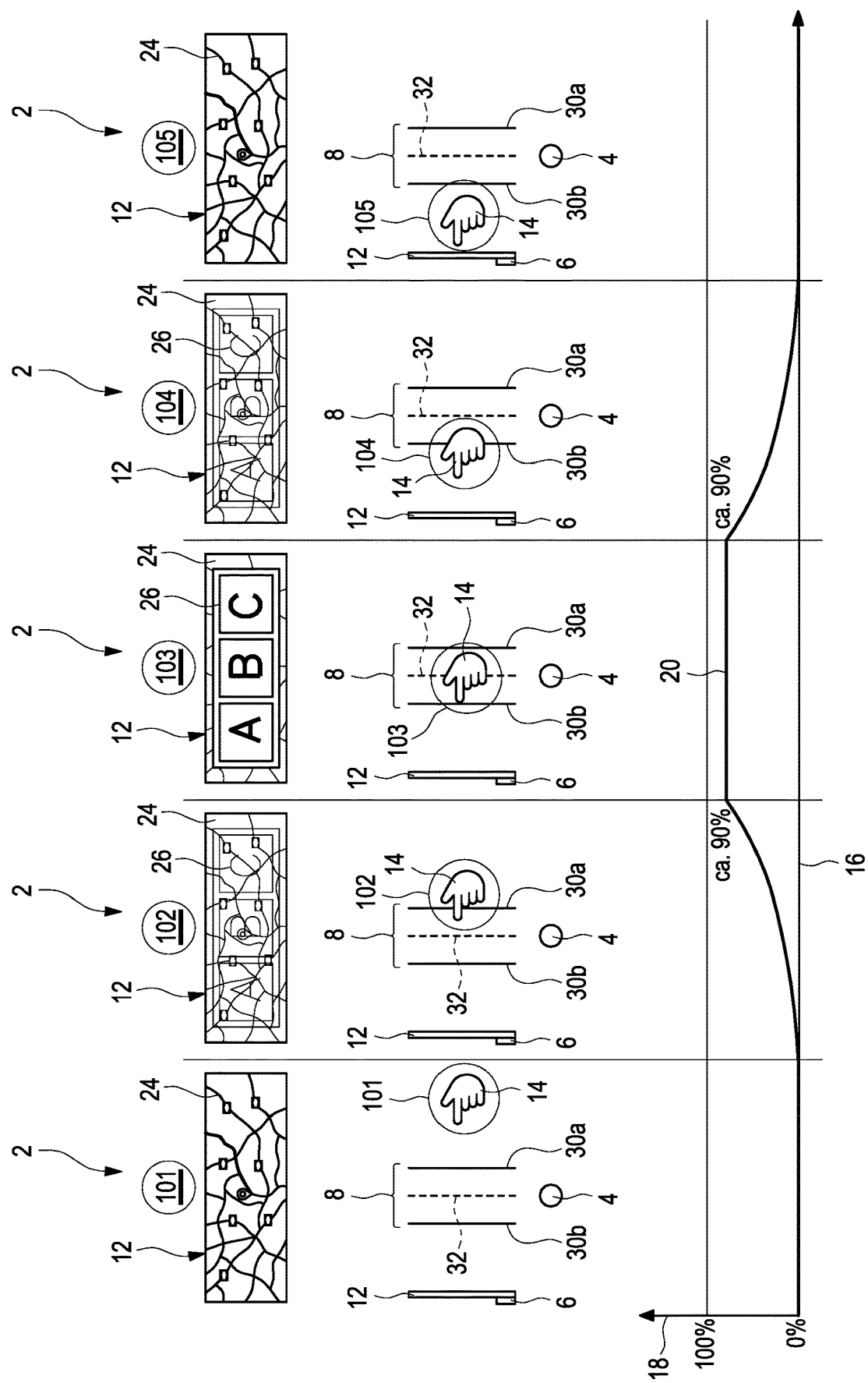
FIG. 1 shows a schematic representation of a first embodiment of the system according to the invention for carrying out a first embodiment of the method according to the invention.
Figure 2:
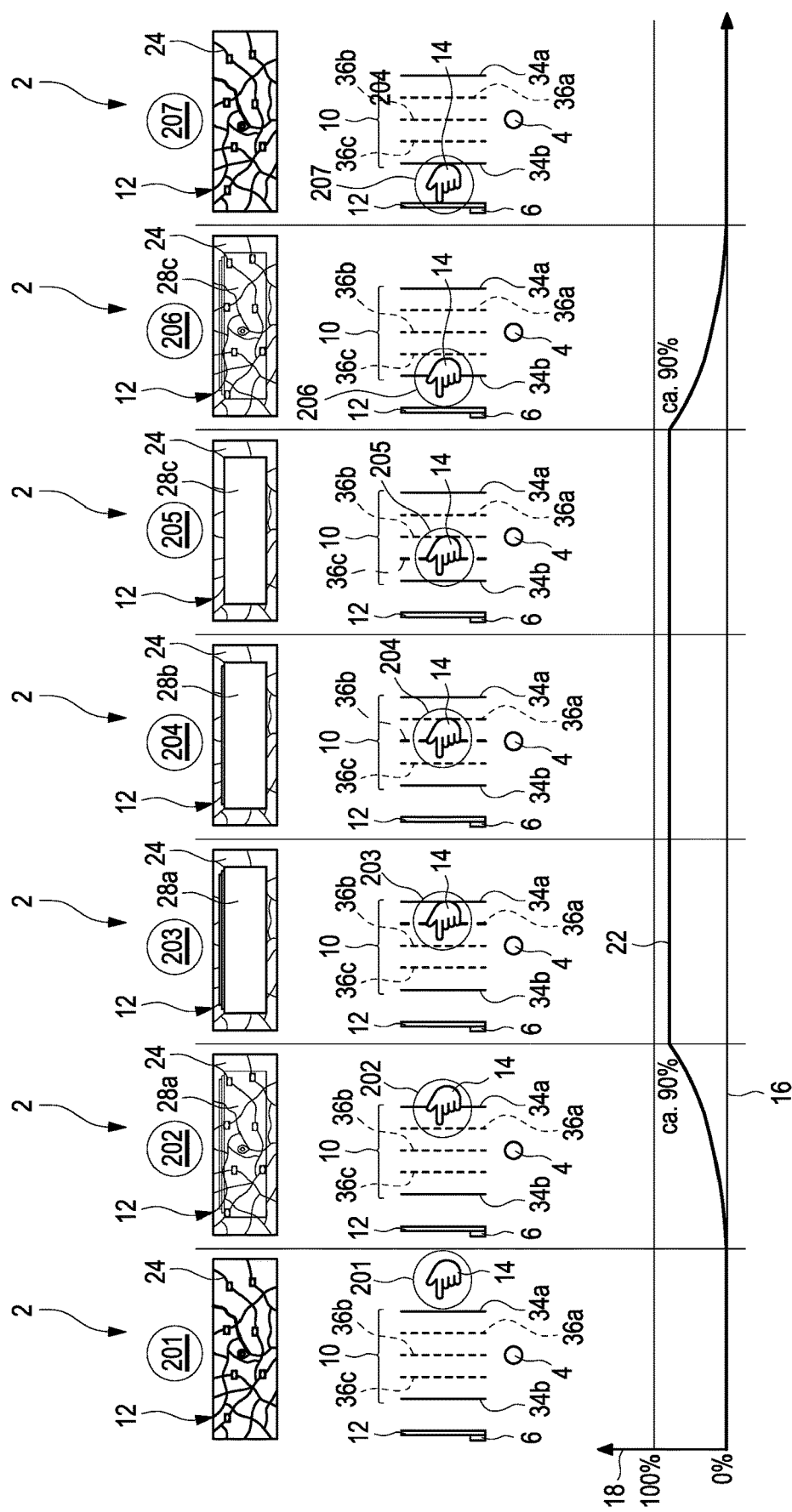
FIG. 2 shows a schematic representation of the embodiment of the system according to the invention from FIG. 1 for carrying out a second embodiment of the method according to the invention.

The embodiment of the system according to the invention is schematically shown both in FIG. 1 on the basis of five partial figures arranged adjacent to one another and also in FIG. 2 on the basis of seven partial figures arranged adjacent to one another and comprises as components an optical sensor 4, designed here as a camera, and a control unit 6. It is provided here that the sensor 4 is arranged in an interior of a vehicle designed here as a motor vehicle. In addition, all of the partial figures of both FIGS. 1 and 2 each show a hand 14 of a user, usually an occupant, in particular a driver, of the vehicle.

In the case of the first embodiment of the method according to the invention (FIG. 1), the sensor 4 is designed to register and/or monitor a first defined corridor 8 and a respective position 101, 102, 103, 104, 105 of the hand 14 of the user relative to the first corridor 8 in the interior. Here, FIG. 1 is divided into five partial figures, wherein each partial figure is assigned to one of the five provided positions 101, 102, 103, 104, 105 of the hand 14. In detail, a first partial figure from FIG. 1 shows the hand 14 at a first position 101 relative to the first corridor 8, a second partial figure shows the hand 14 at a second position 102 relative to the first corridor 8, a third partial figure shows the hand 14 at a third position 103 relative to the first corridor 8, a fourth partial figure shows the hand 14 at a fourth position 104 relative to the first corridor 8, and a fifth partial figure shows the hand 14 at a fifth position 105 relative to the first corridor 8.

In the case of the second embodiment of the method according to the invention (FIG. 2), the sensor 4 is designed to register and/or monitor a second corridor 10 and a respective position 201, 202, 203, 204, 205, 206, 207 of the hand 14 of a user relative to the second corridor 10. Here, FIG. 2 is divided into seven partial figures, wherein each partial figure is assigned to one of the seven provided positions 201, 202, 203, 204, 205, 206, 207 of the hand 14. In detail, a first partial figure from FIG. 2 shows the hand 14 at a first position 201 relative to the second corridor 10, a second partial figure shows the hand 14 at a second position 202 relative to the second corridor 10, a third partial figure shows the hand 14 at a third position 203 relative to the second corridor 10, a fourth partial figure shows the hand 14 at a fourth position 204 relative to the second corridor 10, a fifth partial figure shows the hand 14 at a fifth position 205 relative to the second corridor 10, a sixth partial figure shows the hand 14 at a sixth position 206 relative to the second corridor 10, and a seventh partial figure shows the hand 14 at a seventh position 207 relative to the second corridor 10.

The system 2 is assigned here to a display panel 12 or display in the interior of the vehicle, wherein this display panel 12 is schematically shown in a respective partial figure in each case once from the front in a top view (in the upper region of the respective partial figure) and once from the side in a sectional view (on the left in the respective partial figure) in relation to the sensor 4, the control unit 6, and the respective corridor 8, 10.

Furthermore, FIGS. 1 and 2 show, for all of the respectively provided positions 101, 102, 103, 104, 105 or 201, 202, 203, 204, 205, 206, 207 of the hand 14 relative to the respective corridor 8, 10, a diagram having an abscissa 16 and an ordinate 18. The diagram is arranged in a respective FIG. 1 or 2 below each of the partial figures.

A respective position 101, 102, 103, 104, 105 or 201, 202, 203, 204, 205, 206, 207 of the hand 14 relative to the corridor 8, 10 is plotted along the abscissa 16. A value for an opacity is plotted along the ordinate 18, wherein a first function 20 is shown in the diagram from FIG. 1 and a second function 22 is shown in FIG. 2. The first function 20 shows the dependence of the opacity on the respective position 101, 102, 103, 104, 105 of the hand 14 relative to the first corridor 8 in the first embodiment of the method, and the second function 22 in FIG. 2 shows the dependence of the opacity on the respective position 201, 202, 203, 204, 205, 206, 207 of the hand 14 relative to the second corridor 10 in the second embodiment of the method.

In the embodiments of the method presented here, a basic display content 24, here an excerpt from a map or roadmap, is shown on the display panel 12 independently of a respective position 101, 102, 103, 104, 105, 201, 202, 203, 204, 205, 206, 207 of the hand 14. In both embodiments of the method, in addition to the basic display content 24, at least one additional item of display content 26 or 28a, 28b, 28c is shown partially, completely, or not at all on the display panel 12, in consideration of a respective set opacity or intensity.

In the first embodiment of the method, the first spatial corridor 8 is delimited by two boundary surfaces 30a, 30b, which are flat here, wherein these two boundary surfaces 30a, 30b are arranged parallel to a surface of the display panel 12. In the first corridor 8, only one spatial virtual reference surface 32 is defined or provided here. This reference surface 32, which is flat here, is located centrally between the two virtual boundary surfaces 30a, 30b of the first corridor 8 and is arranged or oriented or extended parallel to the boundary surfaces 30a, 30b.

In the first embodiment of the method, only one additional item of display content 26 is displayed above the basic display content 24, wherein the opacity or intensity for displaying this additional display content 26 is set depending on the respective position 101, 102, 103, 104, 105 of the hand 14 relative to the first corridor 8 and the reference surface 32, wherein the additional item of display content 26 is assigned to this reference surface 32.

The first position 101 for the hand 14 is located outside the first corridor 8. In this case, the opacity for the additional item of display content 26 is set to a minimum value, here of 0%. Starting from the first position 101, the hand 14 moves to the second position 102, wherein the hand 10 intersects the first boundary surface 30a here and is thus partially located in the corridor 8. In this case, a transition value between the minimum value and a maximum value is set for the opacity of the additional item of display content 26. The maximum value can be, for example, 90% of the full opacity or intensity. With a further movement or approach of the hand 14 in the direction of the reference surface 32, the opacity or the transition value of the additional item of display content 26 is steadily increased. The third position 103 of the hand 14 is located here in the middle of the corridor 8, wherein the hand 14 intersects the reference surface 32 here. In this case, the additional item of display content 26 is shown having the maximum value for the opacity. The additional item of display content 26 has three fields "A", "B", and "C", wherein each field is assigned to a function. If the user performs a predetermined gesture with his hand at the third position 103, i.e., moves a finger and/or rotates the hand 14, one of the fields "A", "B", or "C" is selected depending on the gesture, i.e., a predetermined gesture is assigned to each field "A", "B", "C" and furthermore the respectively assigned function is caused to be executed. When the hand 14 moves further in the direction of the display panel 12, it moves away from the reference surface 32 and approaches the second boundary surface 30b of the corridor 8. The transition value is set for the opacity depending on the distance of the hand 14 to the reference surface 32, which is the less the further the hand 14 is spaced apart from the reference surface 32, wherein a fourth position of the hand 14 intersects the second boundary surface 30b of the corridor 8, wherein the transition value is steadily reduced when the hand is moved away from the reference surface 32. A fifth position 105 of the hand 14 is located outside the corridor 8, here between the corridor 8 and the display panel 12. In this case, the opacity of the additional item of display content 26 is reduced to the minimum value, so that only the basic display content 24 is now shown on the display panel 12.

In the second embodiment of the method, the second spatial corridor 10 is delimited by two virtual boundary surfaces 34a, 34b, which are flat here, wherein these two boundary surfaces 34a, 34b are arranged parallel to the surface of the display panel 12. In the second corridor 10, three spatial virtual reference surfaces 36a, 36b, 36c are defined or provided, which are arranged or oriented parallel to one another and parallel to the boundary surfaces 30a, 30b between the two boundary surfaces 30a, 30b of the second corridor 10. A first reference surface 36a has a defined distance to a first boundary surface 34a, and a second reference surface 36b has the same defined distance to the first reference surface 36a and a third reference surface 36c. Furthermore, the third reference surface 36c also has the defined distance to a second boundary surface 34b. Thus, two directly adjacent surfaces, i.e., reference surfaces 36a, 36b, 36c and boundary surfaces 34a, 34b, each have the same defined distance to one another.

In the second embodiment of the method, it is possible to select one of three different additional items of display content 28a, 28b, 28c depending on a respective position 201, 202, 203, 204, 205, 206, 207 of the hand and to show it in addition to the basic display content 24 on the display panel 12. A first additional item of display content 28a is assigned to the first reference surface 36a, a second additional item of display content 28b is assigned to the second reference surface 36b, and a third additional item of display content 28c is assigned to the third reference surface 36c, wherein the opacity or intensity for the display of a respective additional item of display content 28a, 28b, 28c is set depending on the respective position 201, 202, 203, 204, 205, 206, 207 of the hand 14 relative to that reference surface 36a, 36b, 36c to which the additional item of display content 28a, 28b, 28c is assigned.

The first position 201 for the hand 14 is located outside the second corridor 10. In this case, the opacity for at least the first additional display content 28a, here for all additional items of display content 28a, 28b, 28c, is set to a minimum value, here of 0%. Starting from the first position 201, the hand 14 moves to the second position 202, wherein the hand 14 intersects the first boundary surface 34a here and is thus partially located in the corridor 10. In this case, a transition value between the minimum value and a maximum value is set for the opacity of the at least one, here for example the first additional item of display content 28a. The maximum value can be, for example, 90% of the full opacity or intensity. With a further movement or approach of the hand 14 in the direction of at least one, in particular the first reference surface 36a, the opacity of the first additional display content 28a is steadily increased. At its third position 203, the hand 14 intersects the first reference surface 36a here. In this case, the first additional item of display content 28a is displayed with the maximum value for the opacity. When the hand 14 moves further in the direction of the display panel 12, it moves away from the first reference surface 36a and approaches the second reference surface 36b in the corridor 10. As soon as the hand 14 intersects the second reference surface 36b when it reaches the fourth position 204, the second additional item of display content 28b is shown with the maximum value for the opacity, wherein the first additional item of display content 28a is shown or hidden with the minimum value for the opacity. When the hand 14 moves further in the direction of the display panel 12, it moves away from the second reference surface 36b and approaches the third reference surface 36c in the corridor 10. As soon as the hand 14 intersects the third reference surface 36c when it reaches the fifth position 205, the third additional item of display content 28c is shown with the maximum value for the opacity, wherein the second additional item of display content 28b is displayed or hidden with the minimum value for the opacity. A sixth position 206 of the hand 14 intersects the second boundary surface 34b of the corridor 8. In this case, a transition value between the minimum value and the maximum value is set for the opacity of the at least one, here for example the third additional display content 28a, which is steadily decreased or reduced when the hand moves away from the at least one, in particular the third reference surface 36c, with increasing distance of the hand 14. A seventh position 207 of the hand 14 is located outside the corridor 10, here between the corridor 10 and the display panel 12. In this case, the opacity of the third additional display content 28b is reduced to the minimum value, so that only the basic display content 24 is now displayed on the display panel 12. Thus, in the second embodiment of the method, depending on the respective position of the 201, 202, 203, 204, 205, 206, 207, the user can choose between three additional items of display content 28a, 28b, 28b, wherein only one manually selected, i.e., by a respective positioning of the hand 14, additional item of display content 28a, 28b, 28b is displayed on the display panel 12 in addition to the basic display content 24. This means that there are respective spatial areas around the respective reference surfaces 36a, 36b, 36c that can be clearly delimited from one another, which define that as soon as the hand 14 is within a respective spatial area of a respective reference surface 36a, 36b, 36c, only the additional item of display content 28a, 28b, 28c, which is assigned to the respective reference surface 36a, 36b, 36c, is displayed in addition to the basic display content 24, but all other additional items of display content 28a, 28b, 28c assigned to the remaining reference surfaces 36a, 36b, 36c are not displayed. Within a respective spatial area of a respective reference surface 36a, 36b, 36c, the opacity with which the respective additional item of display content 28a, 28b, 28c is displayed, increases as the distance between the hand 14 and the respective reference surface 36a, 36b, 36c decreases.

In both embodiments, the sensor 8 is also designed to recognize gestures of the hand 14, wherein the sensor 8 can also differentiate between different parts of the hand 14, i.e., its fingers, a back of the hand, or a palm of the hand. This results in the possibility of registering and/or ascertaining a respective position 101, 102, 103, 104, 105, 201, 202, 203, 204, 205, 206, 207 of the hand 8 on the basis of a position of a certain part of the hand 8, for example its index finger. In addition, movements or gestures of the hand 14 at a respective position 101, 102, 103, 104, 105, 201, 202, 203, 204, 205, 206, 207 can be recognized, via which a function assigned to a respective gesture can be initiated or activated.

REFERENCE SIGNS 2 system
4 sensor
6 control unit
8, 10 corridor
12 display panel
14 hand
16 abscissa
18 ordinate
20, 22 function
24 basic display content
26 additional item of display content
28a, 28b, 28c additional item of display content 30a, 30b boundary surface
32 reference surface
34a, 34b boundary surface
36a, 36b, 36c reference surface
101, 102, 103, position
104, 105
201, 202, 203, position
204, 205, 206,
207

The invention claimed is:

1. A method for displaying at least one additional item of display content on a display panel which is arranged in an interior of a vehicle, comprising:
   optically monitoring a spatial corridor in the interior of the vehicle using at least one sensor to determine whether a hand of a user is located in the spatial corridor,
   wherein the spatial corridor is delimited by a first virtual boundary surface and a second virtual boundary surface, the second virtual boundary surface closer to a surface of the display panel than the first virtual boundary surface,
   wherein at least one spatial reference surface is defined in the spatial corridor between the first and second virtual boundary surfaces, each of the at least one additional item of display content assigned to a corresponding one of the at least one spatial reference surface, and
   wherein an opacity or intensity of the at least one additional item of display content as displayed on the display panel is increased as the hand of the user crosses the first virtual boundary surface and decreased as the hand of the user crosses the second virtual boundary surface.

2. The method according to claim 1, wherein a selected one of the at least one additional item of display content is displayed on the display panel based on which of the at least one spatial reference surface is in closest proximity to or intersected by the hand of the user.

3. The method according to claim 1, wherein a selected one of the at least one additional item of display content is displayed on the display panel based on movement of the hand of the user relative to the at least one spatial reference surface.

4. The method according to claim 1, wherein the opacity or intensity of the at least one additional item of display content as displayed on the display panel is decreased when the hand of the user is outside of the spatial corridor.

5. The method according to claim 1, wherein a basic display content is displayed on the display panel and overlaid by the at least one additional item of display content depending on a position of the hand relative to the at least one spatial reference surface.

6. The method according to claim 1, wherein a movement and/or gesture of at least one finger of the hand at a position is registered by the at least one sensor to trigger or select a function symbolized by the at least one additional item of display content displayed on the display panel.

7. The method according to claim 1, wherein the second virtual boundary surface is positioned at a nonzero, predetermined distance from the surface of the display.

8. The method according to claim 1, wherein the opacity or intensity of the at least one additional item of display content is reduced to zero as the hand of the user crosses the second virtual boundary surface.

9. The method according to claim 1, wherein the at least one additional item of display content is a plurality of additional display content, and
   wherein the at least one spatial reference surface is a plurality of spatial reference surfaces.

10. The method according to claim 1, wherein the at least one sensor distinguishes between a position of the hand of the user and at least one of a position of an arm of the user and at a position of at least one finger of the user.

11. The method according to claim 1, wherein the surface of the display, the first and second virtual boundary surfaces, and the at least one spatial reference surface are parallel-planar to one another and not coincident with one another.

12. A system for displaying at least one additional item of display content on a display panel which is arranged in an interior of a vehicle, comprising:
   at least one sensor and at least one processor,
   wherein the at least one sensor is configured to optically monitor a spatial corridor in the interior of the vehicle to determine whether a hand of a user is located in the spatial corridor,
   wherein the spatial corridor is delimited by a first virtual boundary surface and a second virtual boundary surface, the second virtual boundary surface closer to a surface of the display panel than the first virtual boundary surface,
   wherein at least one spatial reference surface is defined in the spatial corridor between the first and second virtual boundary surfaces, each of the at least one additional item of display content assigned to a corresponding one of the at least one spatial reference surface, and
   wherein the at least one processor is configured to increase an opacity or intensity of the at least one additional item of display content as displayed on the display panel as the hand of the user crosses the first virtual boundary surface and to decrease the opacity or intensity of the at least one additional item of display content as displayed on the display panel as the hand of the user crosses the second virtual boundary surface.

13. The system according to claim 12, wherein the at least one sensor is a camera.

14. The system according to claim 12, wherein the at least one sensor is a plurality of sensors which each observe the spatial corridor from different perspectives.

15. The system according to claim 12, wherein the second virtual boundary surface is positioned at a nonzero, predetermined distance from the surface of the display.

16. The system according to claim 12, wherein the opacity or intensity of the at least one additional item of display content is reduced to zero as the hand of the user crosses the second virtual boundary surface.

17. The system according to claim 12, wherein the at least one additional item of display content is a plurality of additional display content, and
   wherein the at least one spatial reference surface is a plurality of spatial reference surfaces.

18. The system according to claim 12, wherein the at least one processor distinguishes between a position of the hand of the user and at least one of a position of an arm of the user and at a position of at least one finger of the user.

19. The system according to claim 12, wherein the surface of the display, the first and second virtual boundary surfaces, and the at least one spatial reference surface are parallel-planar to one another and not coincident with one another.

* * * * *